Patented July 30, 1935

2,009,796

UNITED STATES PATENT OFFICE 2,009,796

CHEMICAL COMPOSITION AND METHOD OF MAKING THE SAME

Benjamin R. Harris, Chicago, Ill.

No Drawing. Application November 10, 1933, Serial No. 697,534

17 Claims. (Cl. 252—6)

My invention relates to a new chemical material and method of making the same. It relates more in particular to a new chemical material adapted for use in various arts as an emulsifying agent, wetting agent, and the like.

In certain industries in which oleaginous materials, aqueous materials, and the like, are brought together, there is a need for a material having the general property of improving emulsification, producing a wetting action at the interface of the two materials, and functioning in other ways either to improve certain types of emulsion products or to facilitate the carrying on of certain types of processes. A convenient example is oleomargarine, which is a semi-plastic emulsion of oleaginous materials and aqueous materials in which the oleaginous material constitutes the continuous phase of the emulsion. In the past, oleomargarine emulsions have not been sufficiently stable under all conditions. This emulsion instability manifests itself by the so-called "weeping" or leaking of the margarine. Water in greater or less amounts will separate out of the emulsion during storage, transportation and use of the product. The margarine emulsion, however, being semi-solid, will nevertheless maintain itself so that a complete breaking down of the emulsion is avoided. However, the "weeping" or leaking is very undesirable and causes certain problems in storage and shipping of margarine.

The principal object of my present invention is the provision of a new and improved emulsifying material.

Another object is the provision of a material which when introduced into a water-oil emulsion will have a stabilizing effect therein.

Another object is the provision of an improved material capable of functioning as a wetting agent, emulsifying agent, and the like, in the industries in which this class of material is employed.

Another object is the provision of an improved process for producing this type of material.

Other objects and features of the invention will be apparent as the detailed description progresses.

In general, materials of my invention are modified tri-glycerides, preferably solid at ordinary room temperature. In the preferred form, they are produced in the form of an aqueous paste and seem to function in the intended manner more satisfactorily when used in this form. They may, however, be prepared in a substantially anhydrous condition. These modified fats will have the effect of binding the loose moisture in margarine and/or preventing emulsified aqueous material from separating out. They appear to perform their wetting and emulsifying role by orientating themselves at the water-oil interface of the emulsion or treating bath in which they may be used. However, they do not possess to any noticeable extent the antispattering powers which are characteristic of the materials described in my prior United States Patent No. 1,917,249 and other patents related thereto and issued on the same date.

In general, I prepare my materials by partially saponifying a tri-glyceride with an alkaline saponifying agent, the quantity of alkali employed being insufficient by far to completely saponify the tri-glyceride. I then decompose the soap in the mixture either in whole or in part with acid. When the material is to be employed in edible products, care is used, of course, in selecting an innocuous acid such as hydrochloric acid, phosphoric acid, tartaric acid, lactic acid, citric acid, for example. The alkaline saponifying agent is preferably introduced in liquid form and, when the tri-glyceride is solid, at an elevated temperature at which the tri-glyceride may be rendered fluid. In my preferred manner of carrying out the process, after the saponifying step I make the saponification mixture into a paste using approximately its own weight of water. This paste is then treated with the acid to decompose the soap in the paste either in whole or in part. The following examples are illustrative of the manner of carrying out the invention:

Example No. 1

500 parts of hydrogenated cottonseed oil (melting point 140° F.) are melted and kept at a temperature of 220° C. To this is added, with stirring, a eutectic mixture of 12½ parts of caustic soda and 17½ parts of caustic potash, also melted and kept at 220° C. Vigorous stirring is continued for ten minutes.

This molten mixture is then cooled to about 170° C. and poured gradually, with stirring, into 500 parts of water at 70° C. The paste is then cooled down to about 40° C., when 47.5 parts of "concentrated" hydrochloric acid, diluted with 90 parts of water, are stirred in. The resultant product is a paste which lends itself readily to incorporation with oleomargarine in a margarine blender.

Example No. 2

400 parts of oleostearine are melted, heated and kept at 200° C. To this melt are added, with vigorous stirring, 20 parts of caustic soda dissolved in 30 parts of water. The caustic soda solution is added very slowly at first so as to keep the foaming down to a minimum. As the foam gradually subsides, more caustic soda solution is added. During the addition of the caustic solution, the temperature of the oleostearine drops to about 180° C. and is maintained at this temperature by supplying sufficient heat to the melt.

After all of the caustic soda is in, the stirring is continued for an additional five to ten minutes. This melt is then run, with agitation, into 400 parts of water at 75° C. This mixture is then heated and simultaneously stirred until a smooth dispersed product is obtained. This is cooled down to 50° C. and 130 parts of 28% lactic acid are stirred in.

The product is a homogeneous paste with marked water-imbibing properties and readily blendable with margarine.

Example No. 3

300 parts of cottonseed stearine (iodine number not over 90) are melted to 175° C. and treated with 15 parts of caustic soda dissolved in 65 parts of glycerol, and heated to the same temperature. The glycerol-soda solution is added gradually with stirring and heat control so that a temperature of approximately 175° is maintained throughout. There is some foaming but not very much.

After all the glycerol-soda is in, the heating and stirring are continued for an additional five minutes. This mixture is then run into 300 parts of water kept at 70° C. and stirring is continued until a smoothly dispersed paste is obtained and the temperature has dropped to about 45° C. Finally, into this paste are mixed 62 parts of aqueous hydrochloric acid, 20% solution.

More than the above stated proportions of alkali may be used in which case less unchanged tri-glyceride will appear in the final product. If desired, however, smaller proportions of alkali than those indicated may be used, in which case the product will contain a lesser proportion of modified tri-glyceride than in the above examples, and a greater proportion of unchanged tri-glyceride. The proportion of acid also may be varied a great deal depending upon the characteristics desired in the final product. Obviously the hydrogen ion concentration and/or the amount of soap present will be determined by the amount of acid used. Slight alkalinity appears to be conducive to the formation of a smooth paste. For most purposes, I prefer to employ an amount of acid that repersents approximately 75 to 90% of the total chemical equivalent of the alkali employed. In general, the smoothness of the finished paste, other things being equal, is an inverse function of the proportion of acid used. The less acid used, the smoother will be the paste and the more pronounced its water imbibing properties and to some extent its emulsifying and wetting properties. It should be noted that in general the smaller the proportion of alkali and acid used, the lower will be the free fatty acid content of the finished material.

When employing the materials of my invention, I can use a substantially anhydrous substance, but preferably I use it in paste form. To incorporate the paste in the margarine, for example, I prefer to incorporate it into a plastic margarine emulsion by a blending operation. I have found that for this purpose the paste can be diluted with milk and the paste as well as the milk incorporated into the margerine by the blending operation, so that the final margarine product will be dry and no free moisture will be apparent. When the material is employed in other processes and/or products, the manner of its use will, of course, be modified in accordance with the customs of the art and the result desired.

What I claim as new and desire to protect by Letters Patent of the United States is:

1. The method of producing a new chemical material, which comprises partially saponifying a tri-glyceride to form a mixture including a proportion of soap, and treating the mixture with a relatively strong acid to decrease the proportion of soap.

2. The method of producing a new chemical material which comprises partially saponifying a tri-glyceride to form a mixture including a proportion of soap, and treating the mixture with a sufficient amount of a relatively strong acid to partially decrease the proportion of soap.

3. The method of producing a new chemical material which comprises partially saponifying a tri-glyceride to form a mixture including a proportion of soap, and treating the mixture with an amount of a relatively strong acid to decompose from 75 to 90% of the soap present in the mixture.

4. The method of producing a new chemical material which comprises adding an alkali in liquid form to a tri-glyceride to partially saponify the same, and produce a mixture including a proportion of soap, and treating the mixture with a relatively strong acid to decrease the proportion of soap.

5. The method of producing a new chemical material which comprises dissolving an alkali in glycerol, adding the resulting solution to a tri-glyceride, employing less alkali than required to completely saponify the tri-glyceride, whereby a mixture is produced including a proportion of soap, and treating the mixture with a relatively strong acid to decrease the proportion of soap.

6. The method of producing a new chemical material which comprises partially saponifying a tri-glyceride to form a mixture including a proportion of soap, incorporating a proportion of water with the mixture to form a paste, and treating the paste with a relatively strong acid to decrease the proportion of soap therein.

7. The method of producing a new chemical material which comprises partially saponifying a triglyceride to form a mixture including a proportion of soap, incorporating a proportion of water with the mixture to form a paste, and treating the paste with acid to decrease the proportion of soap therein, the amount of acid employed being insufficient to completely decompose all of said soap.

8. The method of producing a new chemical material which comprises partially saponifying oleostearine to form a mixture including a proportion of soap, forming a paste of the mixture, and treating the paste with a relatively strong acid to partially decrease the proportion of soap.

9. The method of producing a new chemical material which comprises treating hydrogenated cotton seed oil with a sufficient amount of alkali to partially saponify the cotton seed oil and produce a mixture including a proportion of soap, forming a paste of said mixture with water, and treating the paste with a relatively strong acid to partially decrease the proportion of soap.

10. As a new article of manufacture, a chemical mixture formed by partially saponifying a triglyceride and then partially decreasing the proportion of soap therein.

11. As a new article of manufacture, a chemical material formed by partially saponifying a tri-glyceride and decreasing the alkalinity thereof whereby free fatty acids are formed.

12. As a new article of manufacture, a chemical material comprising a partially saponified tri-glyceride, a portion of free fatty acid, and a relatively small amount of soap.

13. The method of producing a new chemical material, which comprises partially saponifying a triglyceride in an anhydrous medium to form a mixture including a proportion of soap, and then treating the resulting mixture with a relatively strong acid.

14. The method of producing a new chemical material which comprises heating together an alkali and a proportion of an oleaginous material of a class consisting of vegetable and animal oils and fats, the amount of alkali being insufficient to completely saponify the oleaginous material, and treating the resulting material with a proportion of a relatively strong acid.

15. The method of producing a new chemical material which comprises melting a eutectic mixture of caustic soda and caustic potash, and heating a greater proportion of oleaginous material of a class consisting of vegetable and animal oils and fats, mixing together and heating said eutectic mixture of caustic soda and caustic potash and said oleaginous material to partially saponify said oleaginous material and incorporating an aqueous liquid with the resulting product to form an aqueous paste.

16. The method of producing a new chemical material which comprises melting a mixture of caustic soda and caustic potash, and heating a greater proportion of oleaginous material of a class consisting of vegetable and animal oils and fats, mixing together and heating said mixture of caustic soda and caustic potash and said oleaginous material to partially saponify said oleaginous material and incorporating an aqueous liquid with the resulting product to form an aqueous paste.

17. The method of producing a new chemical material which comprises melting a substantially dry mixture of caustic soda and caustic potash, heating a greater proportion of oleaginous material of a class consisting of vegetable and animal oils and fats, mixing together and heating said mixture of caustic soda and caustic potash and said oleaginous material to partially saponify said oleaginous material, and incorporating an aqueous liquid with the resulting product to form a paste.

BENJAMIN R. HARRIS.